(12) United States Patent
Thiry et al.

(10) Patent No.: US 12,476,447 B2
(45) Date of Patent: Nov. 18, 2025

(54) SPACER ARM CORONA SHIELD

(71) Applicant: Preformed Line Products Co., Mayfield Village, OH (US)

(72) Inventors: Mark A. Thiry, Richfield, OH (US); Jay D. Duffy, Cleveland Heights, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 589 days.

(21) Appl. No.: 17/899,788

(22) Filed: Aug. 31, 2022

(65) Prior Publication Data
US 2024/0072526 A1    Feb. 29, 2024

(51) Int. Cl.
*H02G 7/12*    (2006.01)

(52) U.S. Cl.
CPC .................................... *H02G 7/12* (2013.01)

(58) Field of Classification Search
CPC ............ H02G 7/14; H02G 7/053; H02G 7/08; H02G 7/12; H02G 7/125; H02G 3/26; H02G 3/0418; F16B 2/10; B25B 1/04; B25B 5/04; E05D 11/0054
See application file for complete search history.

(56) References Cited

U.S. PATENT DOCUMENTS

| | | | | |
|---|---|---|---|---|
| 3,773,967 | A | * | 11/1973 | Sturm ...................... H02G 7/14 174/42 |
| 4,140,868 | A | * | 2/1979 | Tuttle ...................... H02G 7/14 188/380 |
| 2016/0290532 | A1 | * | 10/2016 | Defrance .............. F16L 3/1075 |
| 2017/0149227 | A1 | * | 5/2017 | Richardson, Jr. ...... H02G 7/125 |
| 2017/0194781 | A1 | * | 7/2017 | Bentley .................. H02G 7/125 |

* cited by examiner

*Primary Examiner* — Roshn K Varghese
(74) *Attorney, Agent, or Firm* — Cooper Legal Group, LLC

(57) ABSTRACT

A spacer to hold an electrical cable is provided. The spacer includes a first clamp segment, a second clamp segment, and a hinge connecting the first clamp segment and the second clamp segment and permitting relative movement between the first clamp segment and the second clamp segment from an open position, wherein the first clamp segment and the second clamp segment do not hold the electrical cable, to a closed position, wherein the first clamp segment and the second clamp segment hold the electrical cable. The spacer also includes a corona shield extending from the first clamp segment to the second clamp segment and covering the hinge when the first clamp segment and the second clamp segment are in the open position and when the first clamp segment and the second clamp segment are in the closed position.

20 Claims, 6 Drawing Sheets

SPACER ARM CORONA SHIELD

TECHNICAL FIELD

The present disclosure is directed towards the supporting of a suspended electrical cable and alleviation of corona discharge.

BACKGROUND

Suspended electrical cables often need to be maintained at a spaced location. As such, spacers are utilized. Within one type of spacer, the spacer has an arm that has an end grip portion that that grips a respective cable. Further, the end grip portion may be provided as two clamp segments that are pivotal relative to each other to allow the end grip portion to encircle the respective cable and grip the cable as the two segments are tightened and locked upon the cable. The two clamp segments are pivotally connected via a hinge that allows the relative pivotal movement.

During transmission of electrical current within a cable, a corona discharge may occur. Such corona may be an issue at the end grip portion of the spacer. In particular, such corona may be an issue at the hinge of the spacer.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with one or more aspects, the present disclosure provides a spacer to hold an electrical cable. The spacer includes a first clamp segment, a second clamp segment, and a hinge connecting the first clamp segment and the second clamp segment and permitting relative movement between the first clamp segment and the second clamp segment from an open position, wherein the first clamp segment and the second clamp segment do not hold the electrical cable, to a closed position, wherein the first clamp segment and the second clamp segment hold the electrical cable. The spacer includes a corona shield extending from the first clamp segment to the second clamp segment and covering the hinge when the first clamp segment and the second clamp segment are in the open position and when the first clamp segment and the second clamp segment are in the closed position.

In accordance with one or more aspects, the present disclosure provides a spacer to hold an electrical cable. The spacer includes a first portion having an arm segment, an end segment, and a first clamp segment. The end segment and the first clamp segment are located at opposite ends of the arm segment. The end segment is constructed for attachment to a structure from which the electrical cable is supported. The spacer includes a second portion having a second clamp segment. The spacer includes a connection connecting the first portion and the second portion and permitting relative movement between the first portion and the second portion from an open position, wherein the first clamp segment and the second clamp segment do not hold the electrical cable, to a closed position, wherein the first clamp segment and the second clamp segment hold the electrical cable. The spacer includes a corona shield extending from the first clamp segment to the second clamp segment and covering the connection when the first portion and the second portion are in the open position and when the first portion and the second portion are in the closed position.

In accordance with one or more aspects, the present disclosure provides a spacer to hold an electrical cable. The spacer includes a first portion having an arm segment, an end segment, a first clamp segment, and a first resilient member. The end segment and the first clamp segment are located at opposite ends of the arm segment. The end segment is constructed for attachment to a structure from which the electrical cable is supported. The first resilient member is fastened to an inner surface of the first clamp segment. The spacer includes a second portion having a second clamp segment and a second resilient member fastened to an inner surface of the second clamp segment. The spacer includes a connection connecting the first portion and the second portion and permitting relative movement between the first portion and the second portion from an open position, wherein the first resilient member and the second resilient member do not hold the electrical cable, to a closed position, wherein the first resilient member and the second resilient member hold the electrical cable. The spacer includes a corona shield extending from the first clamp segment to the second clamp segment and covering the connection when the first portion and the second portion are in the open position and when the first portion and the second portion are in the closed position.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
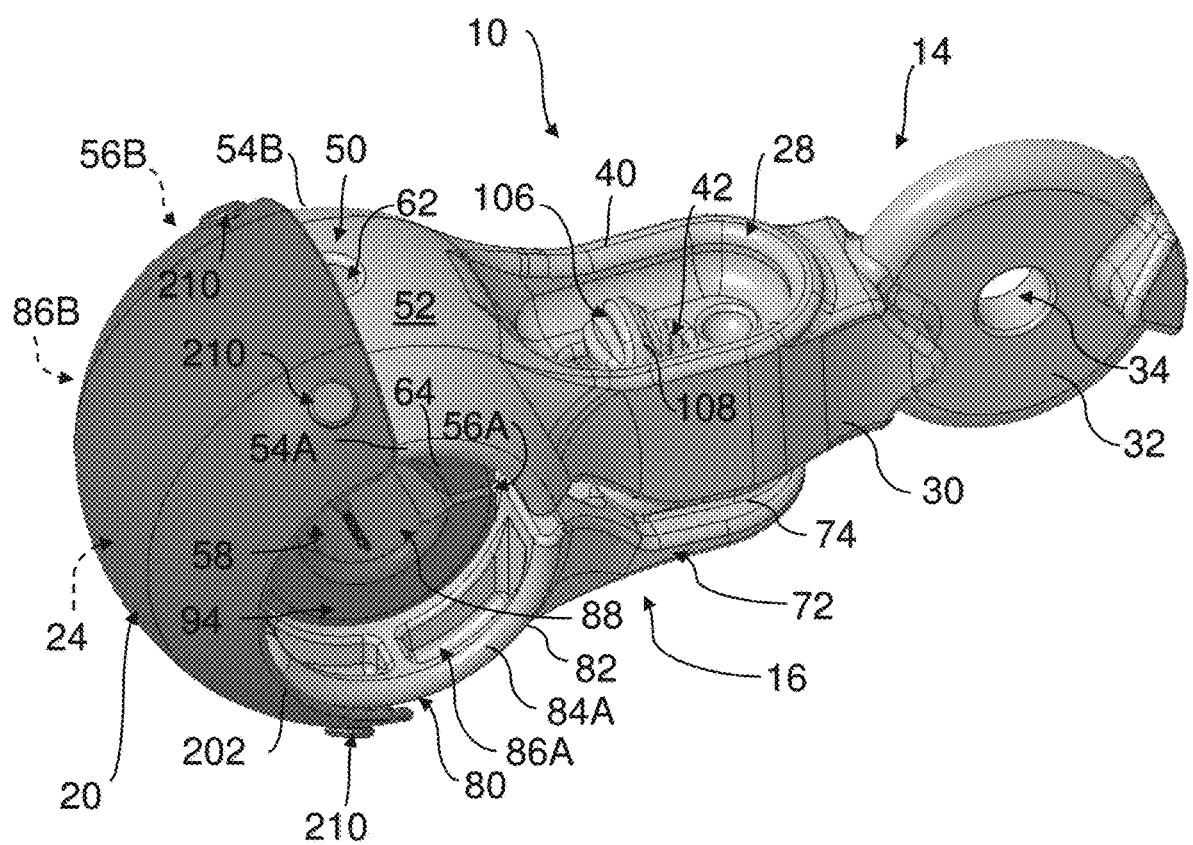
FIG. 1 is a perspective view illustration of an example of a spacer that has an example corona shield according to some embodiments.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

It is to be appreciate that, in one or more examples, the present disclosure provides a spacer to hold at least one electrical cable at a spaced location. The spacer includes a first clamp segment for gripping against the cable, a second clamp segment for gripping against the cable, and a hinge connecting the first and second clamp segments and permitting the first and second clamp segments to pivot relative to each other between an open position and a closed position. The spacer also includes a corona shield extending from the first clamp segment to the second clamp segment and extending to cover the hinge when the first and second clamp segments are pivoted to the closed position.

Corona discharge, also known simply as corona, is a phenomenon associated with electrical transmission cables. Under certain conditions, the localized electric field near energized components and conductors, such as an electrical cable, can produce a tiny electric discharge or corona, which causes the surrounding air molecules to ionize, or undergo a slight localized change of electric charge. A small amount of sound may be produced as a result of corona. Such sound is generally disfavored. Also, corona is associated with energy loss from the associated electrical cable. Energy loss is generally disfavored. Still further, it is possible that damage to some system components may occur due to corona. Damage to components is generally disfavored.

It is to be appreciate that, in one or more examples, the present disclosure provides a spacer to hold at least one electrical cable at a spaced location. The spacer includes a first portion that includes an arm segment, an end segment, and a first clamp segment. The end segment and the first clamp segment are located at opposite ends of the arm segment. The end segment is constructed to permit the first member to be attached to some other structure. The first clamp segment is for gripping against the cable. The spacer includes a second portion. The second portion is movable relative to the first portion. The second portion includes a second clamp segment for gripping against the cable. The spacer includes a connection connecting the first and second relatively movable portions and permitting the first and second portions to move relative to each other between an open position and a closed position. The spacer includes a corona shield extending from the first clamp segment to the second clamp segment and extending to cover the connection when the first and second clamp segments are moved to the closed position.

It is to be appreciate that, in one or more examples, the present disclosure provides a spacer to hold at least one electrical cable at a spaced location. The spacer includes a first portion that includes an arm segment, an end segment, and a first clamp segment. The end segment and the first clamp segment are located at opposite ends of the arm segment. The end segment is constructed to permit the first member to be attached to some other structure. The first portion further includes a first resilient member retained by the first clamp segment and for gripping against the cable. The spacer includes a second portion. The second portion is movable relative to the first portion. The second portion includes a second clamp segment and a first resilient member retained by the second clamp segment for gripping against the cable. The spacer includes a connection connecting the first and second relatively movable portions and permitting the first and second portions to move relative to each other between an open position and a closed position. The spacer includes a corona shield extending from the first clamp segment to the second clamp segment and extending to cover the connection when the first and second clamp segments are moved to the closed position.

An example spacer arm 10, or simply spacer, that is used to hold at least one electrical cable or line (not shown) at a spaced location is shown within FIG. 1. It is to be appreciated that the electrical cable that is to be held by the spacer 10 may have any of a variety of configurations. As such, the specifics regarding the electrical cable need not be limitations upon the present disclosure. It is to be noted that the electrical cable may be associated with transmission of electrical energy at or above a level that may be associated with a possible occurrence of corona. Also, it is to be appreciated that the spacer 10 may be utilized by itself for holding a cable, or may be part of any of a variety of devices, structures and the like for holding one or more cables. Some examples of such devices include devices for holding two or more cables at relatively spaced locations. Other example devices include devices for holding one or more cables as spaced location(s) relative to some other structure (e.g., a support tower, a building, etc.). The specifications and details regarding such other possible portions of the devices for holding may be varied and such variations are within the scope of the present disclosure. Moreover, the specifics regarding such other possible portions of such devices for holding need not be limitations upon the present disclosure.

Figure 3:
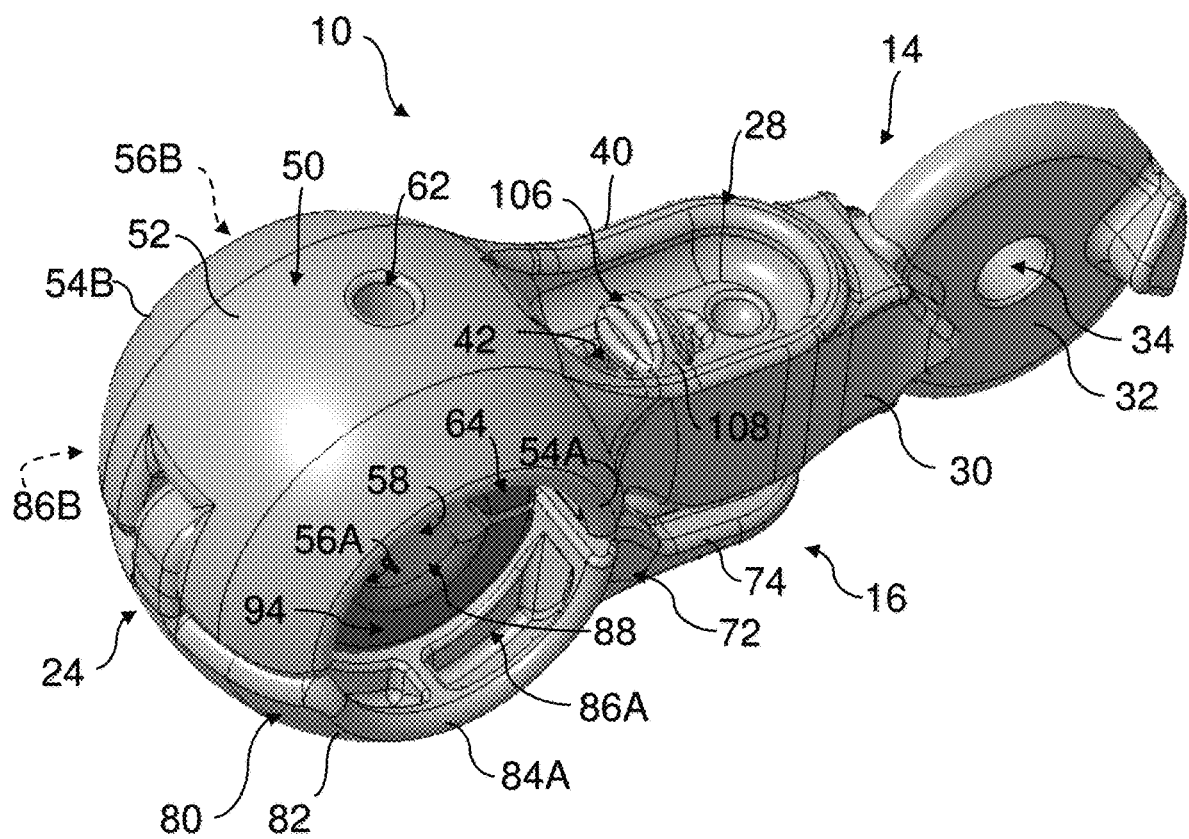
FIG. 3 is perspective view illustration of the example spacer, with the corona shield removed, to show a hinge that connects and permits pivoting of two clamp segments, with the hinge being a location at which corona may occur.
Figure 4:
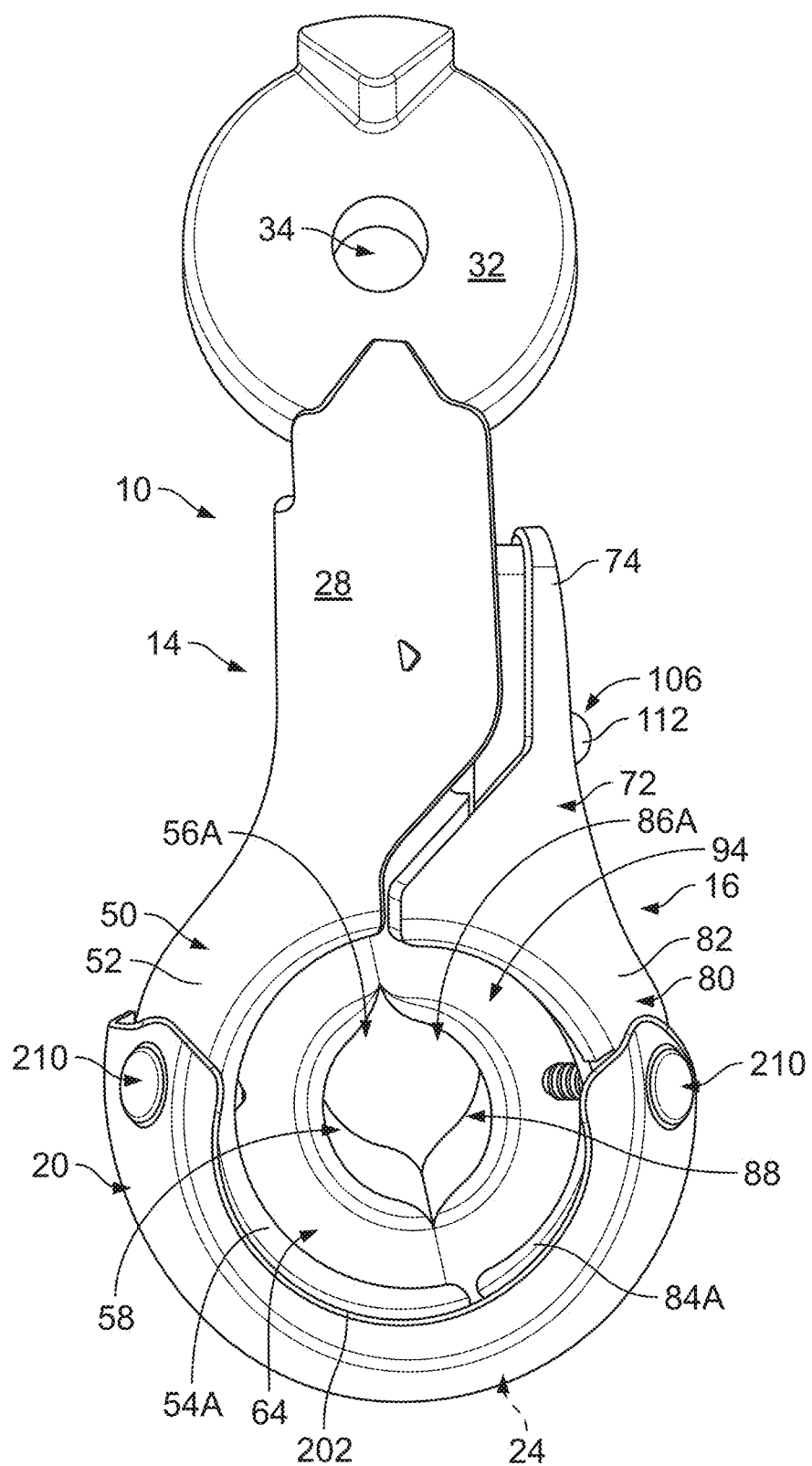
FIG. 4 is a picture of the example spacer of FIG. 1 showing the spacer in a closed position/condition.

Focusing again upon the example shown in FIG. 1, the spacer 10 includes first and second relatively movable portions 14, 16. The first and second portions 14, 16 are movable (e.g., pivotable, as discussed further following) between an open position/condition and a closed position/condition. FIGS. 1, 3 and 4 show the first and second portions 14, 16 in the closed position. While in the closed position, the first and second portions 14, 16 grip against, and hold, the cable as discussed further following.

Figure 2:
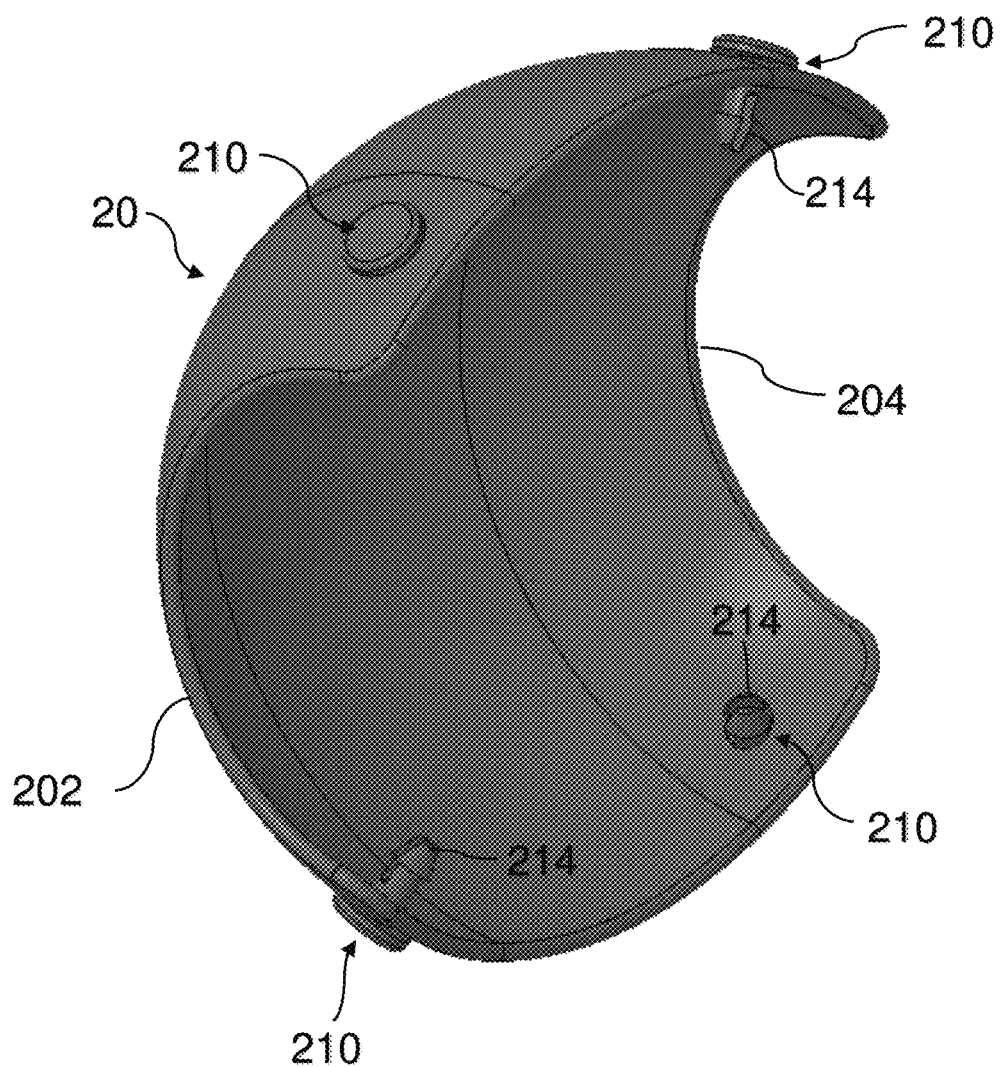
FIG. 2 is a perspective view illustration of the example corona shield of FIG. 1.

The spacer 10 includes a corona shield 20 that extends to cover segments of the first and second relatively movable portions 14, 16 when the first and second portions 14, 16 are in the closed position. See FIG. 2, which shows just the corona shield 20. See FIG. 3, which shows the first and second relatively movable portions 14, 16 in the closed position, and with the corona shield 20 removed so as to show the segments of the relatively movable first and second portions 14, 16 that would be covered by the corona shield. The segments of the first and second relatively movable portions 14, 16 that are covered by the corona shield 20 include segments that are connected via a pivot hinge 24 connecting the first and second portions 14, 16 and permitting the first and second portions to pivot relative to each other between the open position and the closed position. So, the first and second portions 14, 16 are movable relative to each other via the pivoting within the shown example. In other words, the pivoting movement is the movement of the first and second portions 14, 16. However, it is to be appreciated that other types of movement, and thus connection structure therefor, is contemplated and within the scope of the present disclosure. The shown pivot hinge 24 is simply a non-limiting example of a connection.

The first portion 14 includes a rigid first member 28. Within one example, the first member 28 is made of metal. However, it is to be appreciated that other materials having suitable strength, rigidity, etc., may be used.

Within the shown example, the first member 28 includes an arm segment 30. At one end of the arm segment 30, the first member 28 has an end segment 32 (e.g., an attachment segment) that permits the first member 28 to be attached to some other structure(s) of a device, or to some other support, building of the like. Within the shown example, the end segment 32 includes an eyelet 34 for receiving a bolt or similar fastener, a pinion or similar pivot support or similar structure.

At an intermediate location along the arm segment 30, the arm segment has a central portion 40. An aperture 42 extends through the arm segment 30 at the central portion 40.

It is to be appreciated that the specifics (e.g., length, width, structural arrangement(s), etc.) of the arm segment 30 and/or the end segment 32 need not be specific limitation(s) upon the present disclosure. The arm segment 30 and/or the end segment 32 may be varied and such variations are within the scope of the present disclosure.

Figure 6:
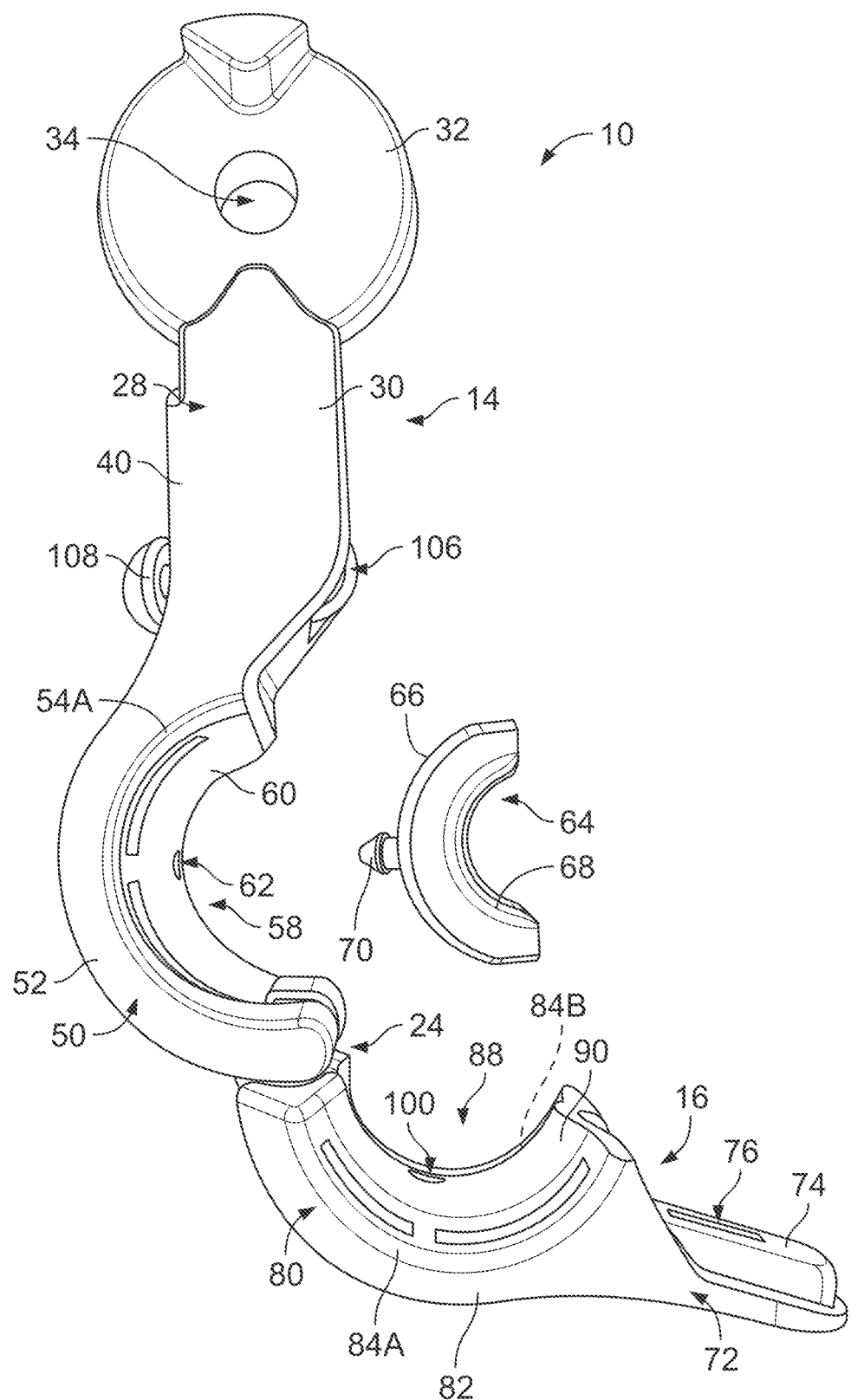
FIG. 6 is a picture of a partially exploded example spacer, with a first resilient member exploded away from an associated clamp segment, and a second resilient member removed an associated clamp segment, to illustrate a possible aspect that a corona shield may be secured to the spacer via different arrangements.

At a second, distal end of the arm segment 30, the first portion 14 includes a first clamp segment 50. As such the first clamp segment 50 and the end segment 32 are at opposite ends of the arm segment 30. An outer surface 52 of the first clamp segment 50 is generally hemispherical. Moreover, the outer surface 52 of the first clamp segment 50 is generally smooth. At each of two axial ends 54A, 54B of the outer surface, the first clamp segment 50 terminates at respective arcuate portions bounding entrance ways 56A, 56B into an interior 58 of the first clamp segment 50. An interior surface 60 (e.g., see FIG. 6) of the first clamp segment 50 is generally hemi-cylindrical and extends between the arcuate portions at the entrance ways 56A, 56B (e.g., see FIGS. 1 and 3) into the interior 58 of the first clamp segment 50. Within a non-limiting example, the first clamp segment 50 includes at least one through-hole 62 (e.g., see FIGS. 3 and 6) extending from the interior 58 of the first clamp segment 50 to the outer surface 52 of the first clamp segment.

The first portion 14 includes a first resilient member 64. It is to be appreciated that the interior surface 60 may be contoured and/or configured to receive and hold the first resilient member 64 of the first portion 14. Accordingly, the first clamp segment 50 holds/retains the first resilient member 64. When the spacer 10 is in the closed position, the first resilient member 64 is pressed to grip against a cable extending through the spacer 10.

The first resilient member 64 may be considered to be a clamp liner. See FIG. 5. The first resilient member 64 may be made of any suitable resilient material. An example material is rubber. The majority shape of the first resilient member 64 is generally a segment-cylinder shape (e.g., a general "C" shape cross-section). An outer surface 66 (e.g., FIG. 6) of the first resilient member 64 generally mates with the interior surface 60 of the first clamp segment 50. An inner surface 68 of the first resilient member is hemi-cylindrical shaped, with a radius that generally matches a radius of the cable extending through the spacer 10. As will be further appreciated following, the first clamp segment 50 squeezes the first resilient member 64 against the cable so that the cable is gripped and held.

It is to be appreciated that the first member 28 and/or the first resilient member 64 has/have structure(s) and/or other means for retaining the first resilient member within the first clamp segment 50 and for retaining the first resilient member within the interior 58 of the first clamp segment. Within a non-limiting example, the first resilient member 64 may include one or more fasteners 70, such as comprising plugs, nipples, etc. (e.g., see FIG. 6), that correspond in number and location to the through-hole(s) 62 of the first clamp segment 50. The fasteners 70 extend into, and possibly through, the through-hole(s) 62 to fasten or retain the first resilient member 64 relative to the first clamp segment 50.

Of course, variations are possible, contemplated and within the scope of the present disclosure. It is to be understood that the first clamp segment 50 and/or the first resilient member 64 may be varied. It is to be understood that the first clamp segment 50 and the first resilient member 64 may be integrated together (e.g., a separate first resilient member is not provided, but the gripping and holding is provided by portion(s) of the first clamp segment). Such types of variation are within the scope of the present disclosure.

The second portion 16 of the spacer 10 includes a rigid second member 72. See for example FIGS. 1 and 3. Within one example, the second member 72 is made of metal. However, it is to be appreciated that other materials having suitable strength, rigidity, etc., may be used.

Within the shown example, the second member 72 includes a mating segment 74 for mating with the central portion 40 of the first member 28 when the spacer 10 is in the closed position (e.g., FIGS. 1, 3 and 4). An aperture 76 (e.g., see FIGS. 5 and 6) extends through the mating segment 74 of the second member 72.

It is to be appreciated that the specifics (e.g., length, width, structural arrangement(s), etc.) of the mating segment 74 need not be specific limitation(s) upon the present disclosure. The mating segment 74 may be varied and such variations are within the scope of the present disclosure.

At an end of the second member 72, the second member includes a second clamp segment 80. An outer surface 82 of the second clamp segment 80 is generally hemispherical. Moreover, the outer surface 82 of the second clamp segment 80 is generally smooth. At each of two axial ends 84A, 84B (e.g., see FIG. 6) of the outer surface 82, the second clamp segment 80 terminates at respective arcuate portions bounding entrance-ways 86A, 86B (e.g., see FIGS. 1 and 3) into an interior 88 of the second clamp segment 80. An interior surface 90 of the second clamp segment 80 is generally hemi-cylindrical and extends between the axial ends 84A, 84B (e.g., see FIG. 6) at the entrance-ways 86A, 86B (e.g., see FIGS. 1 and 3) into the interior 88 of the second clamp segment 80.

The second portion 16 includes a second resilient member 94. It is to be appreciated that the interior surface 90 of the second clamp segment 80 may be contoured and/or configured to receive and hold the second resilient member 94 of the second portion 16. Accordingly, the first clamp segment 50 segment holds/retains the first resilient member 64. When the spacer 10 is in the closed position, the second resilient member 94 is pressed to grip against a cable extending through the spacer 10.

The second resilient member 94 may be considered to be a clamp liner. The second resilient member 94 may be made of any suitable resilient material. An example material is rubber. The majority shape of the second resilient member 94 is generally a segment-cylinder shape (e.g., a general "C" shape cross-section). An outer surface 96 (e.g., see FIG. 5) of the second resilient member 94 generally mates with the interior surface 90 of the second clamp segment 80. Similar to the first resilient member 64, an inner surface 98 of the second resilient member 94 is hemi-cylindrical shaped, with a radius that generally matches a radius of the cable extending through the spacer 10. As will be further appreciated following, the second clamp segment 80 squeezes the second resilient member 94 against the cable so that the cable is gripped and held.

It is to be appreciated that the second member 72 and/or the second resilient member 94 has/have structure(s) and/or other means for retaining the second resilient member within the second clamp segment 80 and for retaining the second resilient member within the interior 88 of the second clamp segment. Within a non-limiting example, the second clamp segment 80 includes at least one through-hole 100 (e.g., see FIG. 6) extending from the interior 88 of the second clamp segment 80 to the outer surface 82 of the second clamp segment. Also with such non-limiting example, similar to the first resilient member 64, the second resilient member 94 (e.g., see FIG. 5) may include one or more fasteners 70, such as comprising plugs, nipples, etc., that correspond in number and location to the through-hole(s) 100 of the second clamp segment 80. A fastener 70 extends into, and possibly through, the through-hole(s) 100 to fasten or retain the second resilient member 94 relative to the second clamp segment 80.

Of course, variations are possible, contemplated and within the scope of the present disclosure. It is to be understood that the second clamp segment 80 and/or the second resilient member 94 may be varied. It is to be understood that the second clamp segment 80 and the second resilient member 94 may be integrated together (e.g., a separate second resilient member is not provided, but the gripping and holding is provided by portion(s) of the second clamp segment). Such types of variation are within the scope of the present disclosure.

A rotatable locking key 106 (see for example FIGS. 1 and 3) extends though the aperture 42 of the arm segment 30. The locking key 106 has an actuator head 108 that may be manually gripped and turned to turn the entire locking key. The locking key 106 has a lock head 112 (e.g., see FIGS. 4 and 5) that may enter the aperture 76 of the mating segment 74 during mating with the central portion 40 of the first member 28 as the spacer 10 is moved to the closed position. The locking key 106 may be actuated to retain the first and second portions 14, 16 of the spacer 10 together in the closed position or actuated to release the first and second portions to be opened. However, to be sure, the locking key 106 and its function, need not be specific limitation upon the present disclosure. The locking key 106 and its function/operation may be varied and such variations are within the scope of the present disclosure.

As mentioned, during transmission of electrical current within a cable, corona discharge may be an issue. Within the construction of the first and second portions 14, 16 being connected by the hinge, 24, the area at the hinge may have a greater propensity to have corona discharge occur. As mentioned, the spacer 10 includes the corona shield 20.

The corona shield 20 has a general hemispherical shape (e.g., see FIG. 2) that generally mimics the outer surface 52 of the first clamp segment 50 and outer surface 82 of the second clamp segment 80. Also, the corona shield 20 is contoured at two axial ends 202, 204. The contoured axial ends 202, 204 generally mimic the profile of the axial ends 54A, 54B, 84A and 84B of the first and second clamp segments 50, 80. As such, the two axial ends 202, 204 generally bound the entrance-ways (e.g., 56A, 56B) into the interior 58 of the first and second clamp segments 50, 80. Moreover, when the spacer 10 is closed (e.g., FIGS. 1, 3 and 4) the corona shield 20 does not engage/interfere with the cable that extends through the spacer 10.

The corona shield 20 is attached to each of the first and second clamp segments 50, 80. The manner/structure of such attachment may be varied and thus the specifics regarding attachment need not be specific limitation upon the present disclosure.

FIGS. 1, 2, 4 and 5 show an example with a series of retention members 210 that extend from the corona shield 20 to the first and second clamp segments 50, 80 to retain the corona shield 20 to the first and second clamp segments 50, 80. Specifically within an example, the retention members 210 may be resilient plugs that are force-fit into corresponding apertures 212 (e.g., see FIG. 5) extending into/though the first and second clamp segments 50, 80. Note that FIGS. 1, 2, 4 and 5 present such an example, but again it is to be appreciated that different manner/structure of attachment are contemplated and within the present disclosure.

Focusing again upon the shown example of FIGS. 1, 2, 4 and 5, the apertures in the first and second clamp segments 50, 80 extend through the first and second clamp segments and the retention members (e.g., plugs) 210 are of length to extend through the first and second clamp segments. According to some embodiments, a retention member (e.g., plug) 210 has a resilient head 214 that may compress during penetration into a first and/or second clamp segment (e.g., 50, 80), and may de-compress (e.g., expand back to an original dimension) if/once the head has passed beyond an aperture 212. Once re-expanded, the head 214 may have a (e.g., bottom) surface area that inhibits passage of the retention member back through the aperture 212. For example, a dimension (e.g., diameter) of the surface may be greater than a dimension (e.g., diameter) of the aperture 212.

Again, the specifics of retention need not be specific limitation upon the present disclosure. Various other methods, structures, etc. for retaining the corona shield 20 to the first and second clamp segments 50, 80 are contemplated and with the scope of the present disclosure. For example, the one or more fasteners 70 that retain the resilient members 64, 94 to the respective first and second clamp segments 50, 80 could be reconfigured (e.g., elongated) and also extend to retain the corona shield 20. Accordingly, a fastener 70 could function as a retention member 210, such as by extending through a through-hole (e.g., 62, 100) and through an opening in corona shield 20 to hold the corona shield 20 to the first clamp segment 50 and/or the second clamp segment 80. Multiple such fasteners of the same or varying sizes, shapes, dimensions, configurations, etc. are also contemplated to hold a corona shield in place.

As mentioned, during transmission of electrical current within a cable, a corona discharge may try to occur. Such corona may be an issue at the portion (e.g., the first and second clamp segments 50, 80) of the spacer 10 that grips the electrical cable. In particular, such corona may be an issue at the hinge 24 of the spacer 10.

The corona shield 20 extends to cover the first and second clamp segments 50, 80 when the first and second portions 14, 16 are in the closed position. Also, the corona shield 20 covers the hinge 24 of the spacer 10. See FIGS. 1 and 4, and note that the hinge 24 is hidden within the corona shield 20 for these figures. See FIG. 3, which shows the first and second relatively movable portions 14, 16 in the closed position, and with the corona shield 20 removed so as to show the segments of the relatively movable first and second portions 14, 16 that would be covered by the corona shield.

The corona shield 20 is made of material that has a relatively high electrical resistance. Also, the corona shield 20 is made of material that has a relatively high resistance against corona discharge. Within an example, the material of the corona shield 20 is rubber. However, it is to be appreciated that other materials that provide resistance against corona discharge are contemplated and within the scope of the present disclosure.

Also, the manner/structure for attachment (e.g., the retention members 210) for attachment of the corona shield 20 to the first and second clamp segments 50, 80 is made of material that has a relatively high electrical resistance and specifically material that has a relatively high resistance against corona discharge. Within an example, the material is plastic.

Figure 5:
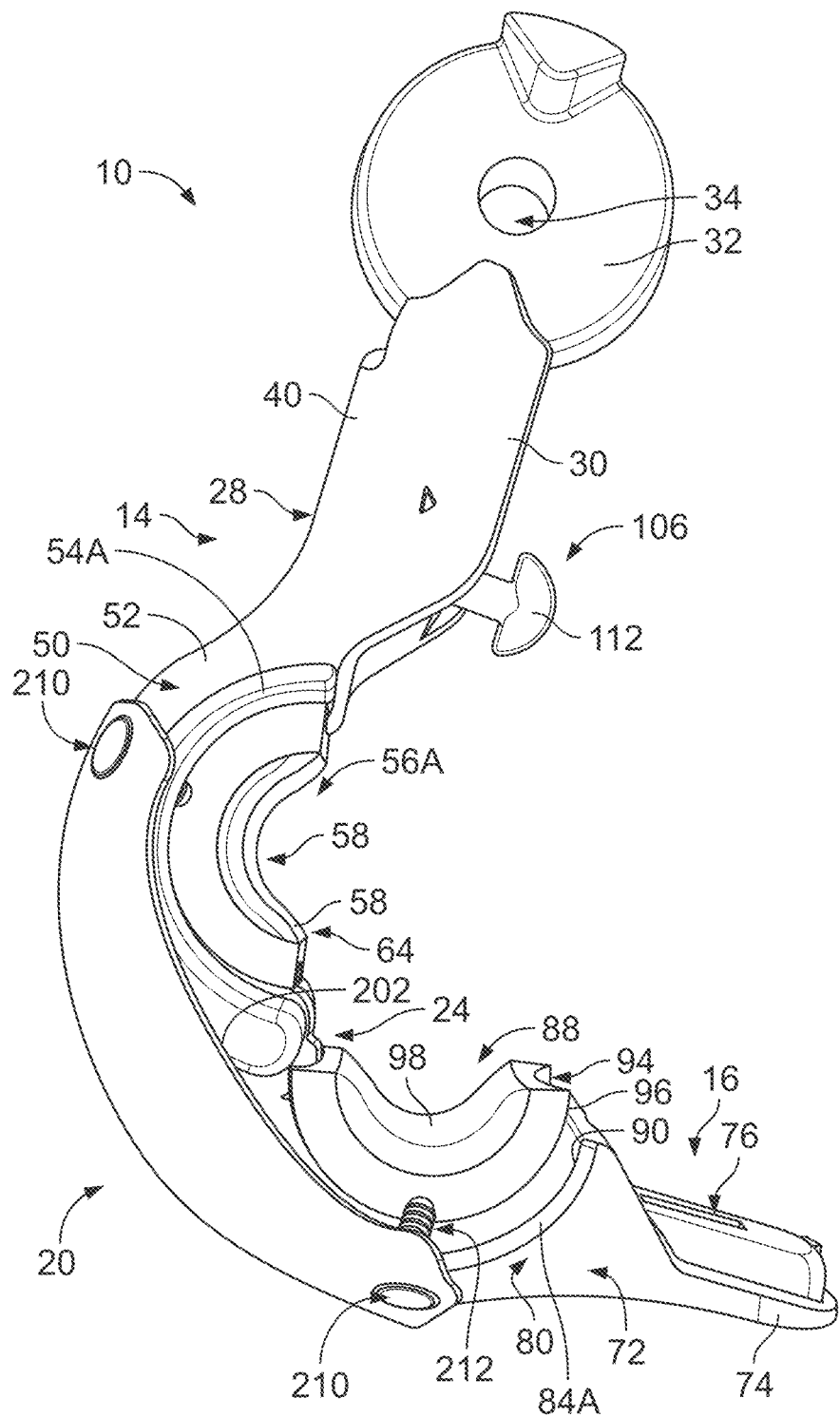
FIG. 5 is a picture of the example spacer of FIG. 1 showing the spacer in an open position/condition and showing the example corona shield flexed to accommodate the pivoting of the two clamp segments.

It is to be appreciated that the corona shield 20 and the manner/structure for attachment (e.g., the retention members 210), and the materials of such, are selected to permit the first and second clamp segments 50, 80 to move between the closed position (e.g., FIGS. 1, 3 and 4) and the open position (e.g., FIG. 5). See that within the shown example of FIG. 5, the corona shield 20 is made of a material (e.g., rubber) and the retention members 210 are located such that the corona shield 20 flexes, elastically deforms, or the like as the first and second clamp segments 50, 80 move to the open position. Another way of considering the material of the corona shield 20 is that the material is elastically resilient. Note that there may be some movement of some of the corona shield 20 away from (e.g., spacing from) the first and second clamp segments 50, 80 and the hinge 24 when the first and second portions 14, 16 are moved to the open position. As the first and second clamp segments 50, 80 are moved to the closed position, the corona shield 20 covers the first and second clamp segments 50, 80 and the hinge 24 (e.g., see FIG. 1).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A spacer to hold an electrical cable, comprising:
   a first clamp segment;
   a second clamp segment;
   a hinge connecting the first clamp segment and the second clamp segment and permitting relative movement between the first clamp segment and the second clamp segment from an open position, wherein the first clamp segment and the second clamp segment do not hold the electrical cable, to a closed position, wherein the first clamp segment and the second clamp segment hold the electrical cable; and
   a corona shield having a first end and a second end, and extending from the first end, at the first clamp segment, to the second end, at the second clamp segment, and covering the hinge when the first clamp segment and the second clamp segment are in the open position and when the first clamp segment and the second clamp segment are in the closed position, wherein the corona shield is flexible to flex during the relative movement between the first clamp segment and the second clamp segment.

2. The spacer as set forth in claim 1, wherein:
   the first clamp segment has a hemispherical outer surface,
   the second clamp segment has a hemispherical outer surface, and
   the corona shield has a hemispherical inner surface that conforms to the hemispherical outer surface of the first clamp segment and the hemispherical outer surface of the second clamp segment.

3. The spacer as set forth in claim 1, wherein the corona shield comprises a corona discharge resistant material.

4. The spacer as set forth in claim 1, wherein the corona shield comprises an elastomeric material.

5. The spacer as set forth in claim 1, wherein the corona shield comprises rubber.

6. The spacer as set forth in claim 1, comprising a retention member that retains the corona shield to at least one of the first clamp segment or the second clamp segment.

7. The spacer as set forth in claim 1, comprising a first retention member that retains the corona shield to the first clamp segment and a second retention member that retains the corona shield to the second clamp segment.

8. The spacer as set forth in claim 1, comprising a first resilient member fastened to the first clamp segment, wherein the first resilient member grips the electrical cable to hold the electrical cable when the first clamp segment and the second clamp segment are in the closed position.

9. The spacer as set forth in claim 8, comprising a first fastener that fastens the first resilient member to the first clamp segment.

10. The spacer as set forth in claim 9, wherein the first clamp segment defines a first through-hole and the first fastener extends from the first resilient member through the first through-hole to fasten the first resilient member to the first clamp segment.

11. The spacer as set forth in claim 10, wherein the first fastener functions as a first retention member to retain the corona shield to the first clamp segment.

12. The spacer as set forth in claim 11, wherein the corona shield defines an opening and the first fastener extends through the opening to retain the corona shield to the first clamp segment.

13. A spacer to hold an electrical cable, comprising:
a first portion comprising an arm segment, an end segment, and a first clamp segment, the end segment and the first clamp segment located at opposite ends of the arm segment, the end segment constructed for attachment to a structure from which the electrical cable is supported;
a second portion comprising a second clamp segment;
a connection connecting the first portion and the second portion and permitting relative movement between the first portion and the second portion from an open position, wherein the first clamp segment and the second clamp segment do not hold the electrical cable, to a closed position, wherein the first clamp segment and the second clamp segment hold the electrical cable; and
a corona shield extending from the first clamp segment to the second clamp segment and covering the connection when the first portion and the second portion are in the open position and when the first portion and the second portion are in the closed position, wherein the corona shield is configured to move with the first clamp segment and the second clamp segment during the relative movement between the first clamp segment and the second clamp segment.

14. The spacer as set forth in claim 13, wherein:
the first clamp segment has a hemispherical outer surface,
the second clamp segment has a hemispherical outer surface, and
the corona shield has a hemispherical inner surface that conforms to the hemispherical outer surface of the first clamp segment and the hemispherical outer surface of the second clamp segment.

15. The spacer as set forth in claim 13, wherein the corona shield comprises a polymer.

16. The spacer as set forth in claim 13, comprising a first retention member that retains the corona shield to the first clamp segment and a second retention member that retains the corona shield to the second clamp segment.

17. The spacer as set forth in claim 16, comprising:
a first resilient member; and
a first fastener that fastens the first resilient member to the first clamp segment, wherein the first resilient member grips the electrical cable to hold the electrical cable when the first portion and the second portion are in the closed position.

18. The spacer as set forth in claim 17, wherein the first clamp segment defines a first through-hole and the first fastener extends from the first resilient member through the first through-hole to fasten the first resilient member to the first clamp segment.

19. A spacer to hold an electrical cable, comprising:
a first portion comprising an arm segment, an end segment, a first clamp segment, and a first resilient member, the end segment and the first clamp segment located at opposite ends of the arm segment, the end segment constructed for attachment to a structure from which the electrical cable is supported, the first resilient member fastened to an inner surface of the first clamp segment;
a second portion comprising a second clamp segment and a second resilient member fastened to an inner surface of the second clamp segment;
a connection connecting the first portion and the second portion and permitting relative movement between the first portion and the second portion from an open position, wherein the first resilient member and the second resilient member do not hold the electrical cable, to a closed position, wherein the first resilient member and the second resilient member hold the electrical cable; and
a flexible corona shield extending from the first clamp segment to the second clamp segment and covering the first portion, the second portion and the connection when the first portion and the second portion are in the open position and when the first portion and the second portion are in the closed position.

20. The spacer as set forth in claim 19, comprising a first retention member that retains the corona shield to the first clamp segment and a second retention member that retains the corona shield to the second clamp segment.

* * * * *